Figure 1:
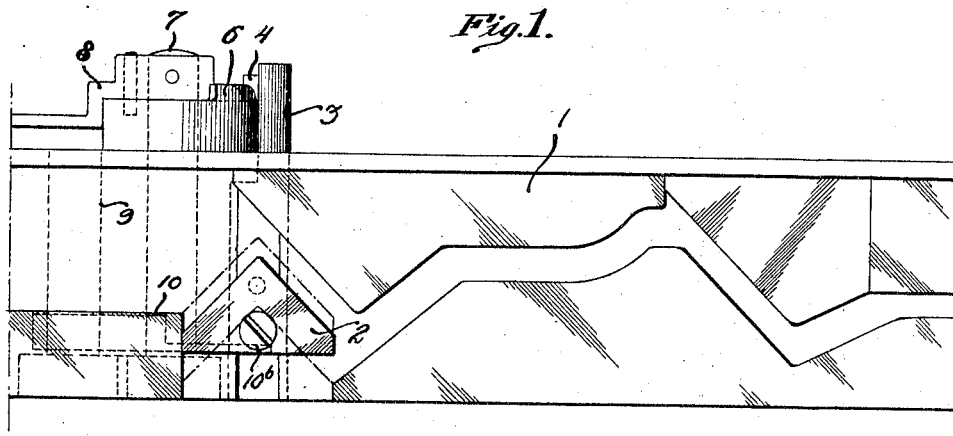

Dec. 28, 1926.

H. S. REGAR

RIBBING MACHINE

Filed June 21, 1922

1,611,946

6 Sheets-Sheet 1

Witnesses
George A. Gruss
Elizabeth Garbe

Inventor
Howard Severn Regar
By Joshua R.H.Potts
his Attorney

Dec. 28, 1926.
H. S. REGAR
1,611,946
RIBBING MACHINE
Filed June 21, 1922
6 Sheets-Sheet 2
Fig. 4.
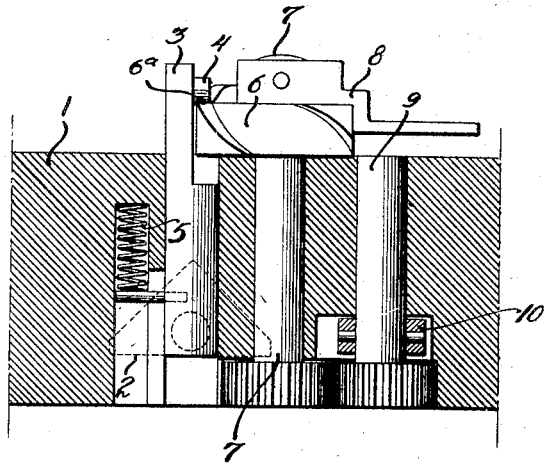
Fig. 5.
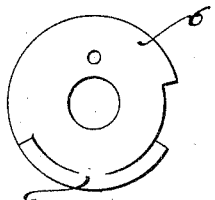
Fig. 7.
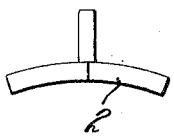
Fig. 6.
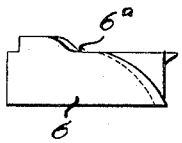
Fig. 8.
Witnesses
George A. Gruse
Elizabeth Garbe
Inventor
Howard Seven Regar
By Joshua R.H. Potts
his Attorney Dec. 28, 1926.
H. S. REGAR
1,611,946
RIBBING MACHINE
Filed June 21, 1922   6 Sheets-Sheet 3
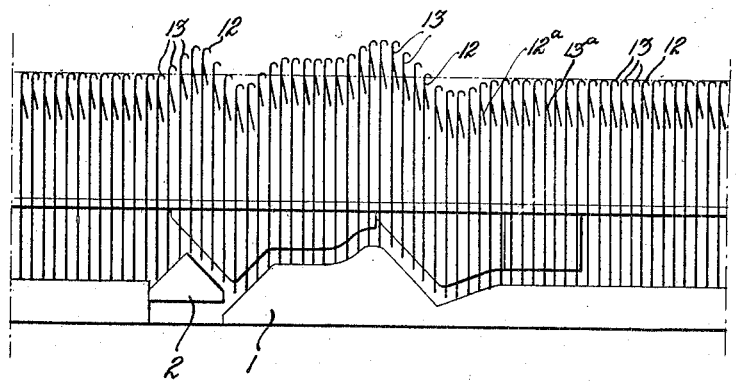
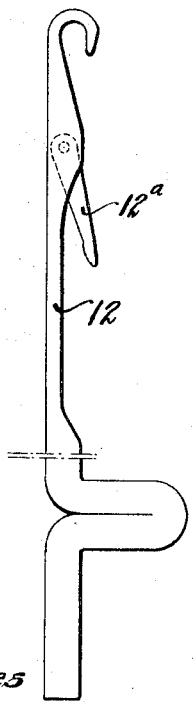
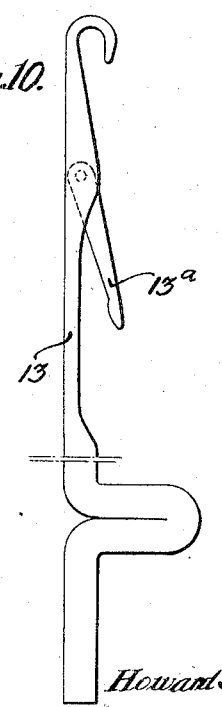
Witnesses
George A. Gruss
Elizabeth Garbe
Inventor
Howard Severn Regar
By Joshua R. H. Potts
his Attorney Dec. 28, 1926.

H. S. REGAR

RIBBING MACHINE

Filed June 21, 1922

1,611,946

6 Sheets-Sheet 4

Witnesses
George A. Gruss
Elizabeth Garle

Inventor
Howard Severn Regar
By Joshua R. H. Potts
his Attorney

Dec. 28, 1926.  
H. S. REGAR  
RIBBING MACHINE  
Filed June 21, 1922  
1,611,946  
6 Sheets-Sheet 5

WITNESSES:  
Alfred E. Schinger  
Evelyn Crompton

INVENTOR:  
Howard Severn Regar,  
BY  
Joshua R H Potts  
ATTORNEY.

Dec. 28, 1926.  
H. S. REGAR  
RIBBING MACHINE  
Filed June 21, 1922
1,611,946
6 Sheets-Sheet 6
FIG_17
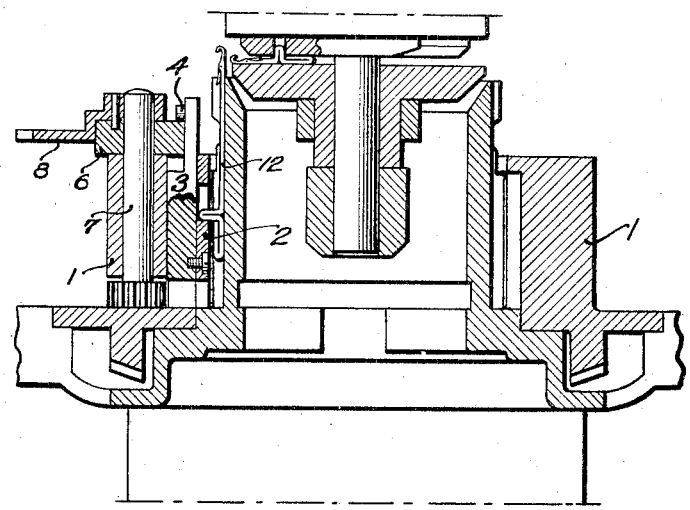
WITNESSES:
INVENTOR:  
Howard Severn Regar,  
BY  
HIS ATTORNEY Patented Dec. 28, 1926.

1,611,946

UNITED STATES PATENT OFFICE.

HOWARD SEVERN REGAR, OF NORRISTOWN, PENNSYLVANIA.

RIBBING MACHINE.

Application filed June 21, 1922. Serial No. 570,018.

My invention relates more especially to such machines when used to produce drop stitch fabrics.

The usual method of producing such fabrics is by omission of cylinder needles. One objection to that method is that the drop stitch is necessarily continued through the entire length of the tubular fabric to be produced including tucks, welts and the like. the result being imperfect tucks, welts, etc., and the production of plain courses is impossible.

Another objection is that omission of a needle leaves the drop stitch yarn straight and produces a comparatively unyielding stitch.

A further objection is that when the drop stitch fabric is joined to a differently knitted fabric an objectionable hole is left at the end of each line of drop stitches.

The object of my invention is to provide simple and effective mechanism whereby, without change in cylinder or dial and with a complete set of needles, a ribbing machine may be made capable of producing drop stitch fabrics without in any degree impairing its capacity for producing perfect plain courses, clearing courses, tuck stitches, welts or any other normal product of a ribbing machine; whereby the transition from drop stitch to other stitches may be made without leaving objectionable holes, and whereby a more yielding or elastic and more attractive drop stitch may be produced.

These results are produced by the use of long-latched and short-latched cylinder needles in conjunction with some changes in cam mechanism whereby the short-latched needles may be positioned to cause them to shed their loops, without forming stitches, or positioned to perform the same functions as the long-latched needles.

In the drawings:—

Figure 2:
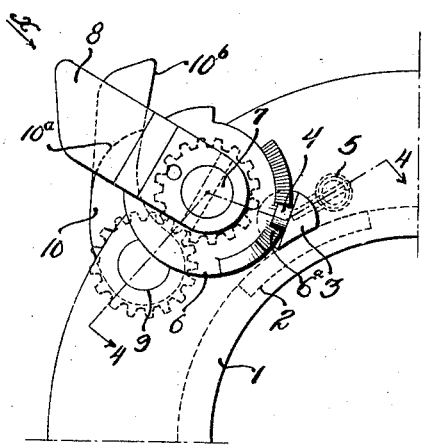
Figure 3:
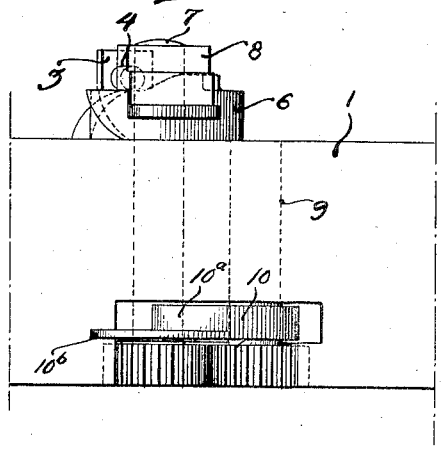

Figure 1 is a developed view of the cylinder needle guide way of a knitting machine embodying my invention, Figure 2 a top plan view of the mechanism shown in Figure 1, Fig. 3 an elevational view looking in the direction of the arrow X of Figure 2, Figure 4 a section taken on the line 4—4 of Figure 2, Figures 5 and 6 are top plan and side elevations of a clearing course raising cam somewhat modified from the usual cam for the purpose, Figures 7 and 8 are top plan and side elevations of the long stud gear cam, also somewhat modified from the usual.

Figure 14:
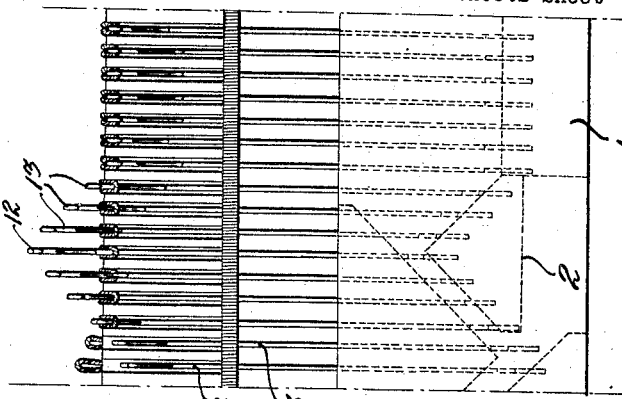
Figure 13:
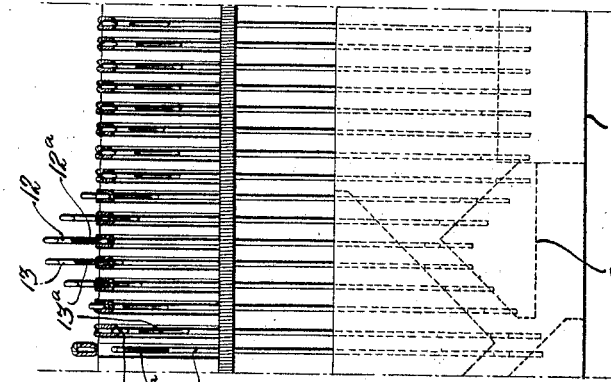
Figure 12:
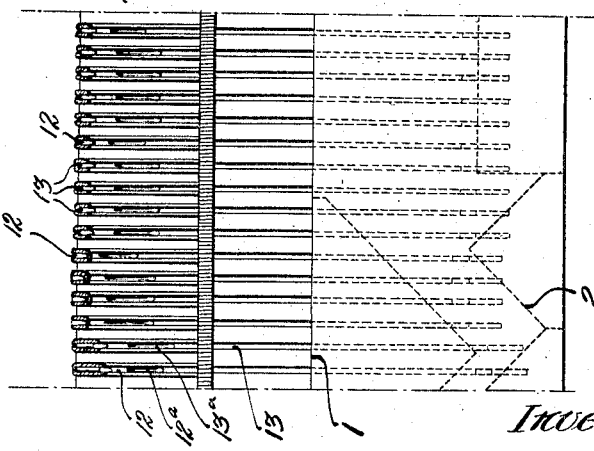

Figures 9 and 10 are elevations of short and long latched needles,

Figure 11 is a diagrammatic developed view of the cylinder needles in their guide way, Figure 12 a fragmentary elevational view of the cylinder showing the triangular cam in its lower position, Figure 13 a like view showing the cam in its intermediate position and illustrating its effect on the short latched needles to cause them to shed their loops, Figure 14 a like view showing the triangular cam in its upper position and illustrating its effect on all the needles to cause them to shed their loops, the views shown in Figures 12, 13 and 14 being reversed relatively to those shown in Figures 1 and 11.

Figure 15:
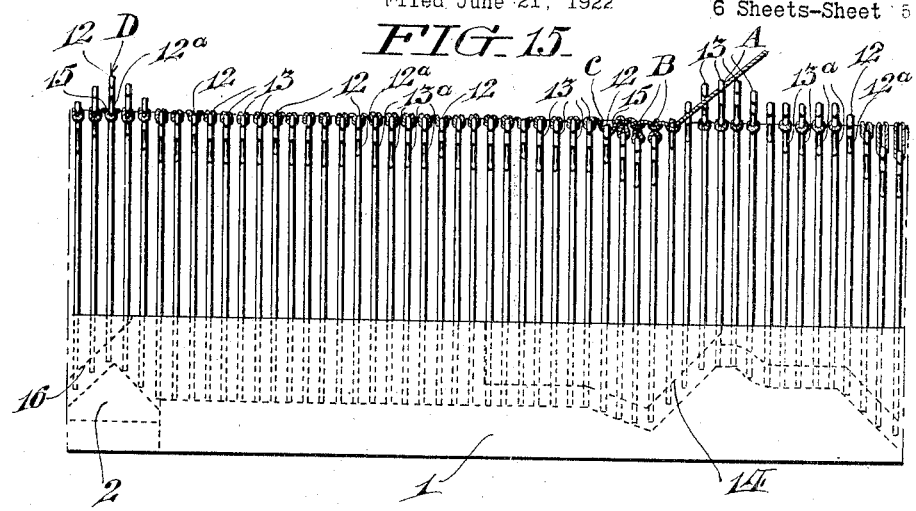
Figure 16:
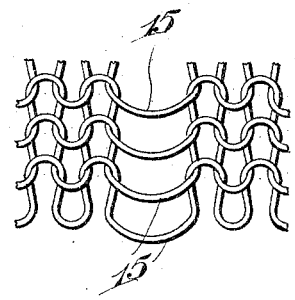

Figure 15 is a diagrammatic developed view of the cylinder needles in their guide-way showing the action of the needles upon the yarn, Figure 16 a fragmentary view of the finished fabric, and Figure 17 is a fragmentary central section through a ribbing machine embodying my invention.

Inasmuch as my improvements are designed for use with ribbing machines of usual type and the changes from the usual mechanism are simple I have illustrated only as much of a ribbing machine as is essential to an understanding of the invention.

In the drawings, 1 indicates the rotatable cam casing, 2 the clearing course raising cam, hereinafter called the needle raising cam, 3 the cam post for raising and lowering the cam, 4 the pin extending from the post and riding on the face of the long stud gear cam, 5 the cam post spring exerting downward pressure on the cam post, 6 the long stud gear cam, 7 the long stud gear, 8 the long stud gear lever, 9 the short stud gear and 10 the short stud gear lever which is shown as provided with two engaging faces 10$^a$ and 10$^b$.

The needle raising cam 2 differs from the usual construction in having its apex carried to a point instead of being slightly flattened or rounded being thereby adapted to raise the needles slightly higher than has been required. The same result would be attained by making the cam slightly higher without changing its shape. The long stud gear cam differs from the usual construction in having in its cam face a ledge 6ᵃ whereby an intermediate position is provided for the needle raising cam. In other words the stud gear cam is adapted to hold the needle raising cam in an intermediate position in which only the short latch needles will shed their loops for making the drop stitch wales and the usual high position, in which all cylinder needles shed their loops so that only the dial needles will knit the clearing course. The short stud gear lever as shown, differs from the usual construction in having two engaging faces instead of one. Any construction which provides a suitable short armed lever, in addition to the usual lever, would produce the same result.

The disk, not shown, is provided with a suitable part adapted to engage the face 10ᵃ of lever 10 and force the lever inward until the pin on cam post 3 reaches the ledge 6ᵃ in cam 6 and thereby holds the needle raising cam 2 in its intermediate position.

Except as above indicated, the construction may be that of the usual ribbing machine and the parts are operated in the usual way.

In Figures 9 and 10, 12 indicates a needle provided with a short latch 12ᵃ and 13 a needle provided with a longer latch 13ᵃ. The long-latched needles perform the usual function in the usual way. The short-latch needles serve a double function. In producing a drop stitch fabric they act to produce a drop stitch of a novel kind but, when the end of the drop stitch part of the fabric is reached they perform the usual function of cylinder needles.

As shown in Figures 11 to 14 the needles are arranged in a series in which there are four long-latched needles, then one short-latched needle, then four long-latched needles and one short-latched needle, etc., but the series may be varied at will.

To knit plain ribbed courses, that is without dropped stitches, cam 2 is adjusted to its low position, as shown in Figure 12, where it does not in any way affect the needles in their knitting operation.

To knit dropped stitch courses, cam 2 is adjusted to its intermediate position as shown in Figure 13, where it raises all cylinder needles to the same height. This height does not bring the lower end of long latch 13ᵃ, above its loop, but does bring the lower end of short latch 12ᵃ, above its loop. As the needles are moved downward by the usual cams, the long latch needles 13 will retain their loops but the short latch needles 12 will shed or slip out of their loops. As a result, the lines or wales of the knitted fabric which were acted on by the short latch needles are not stitches, but merely threads of arched shape extending from one group of four vertical lines or wales of stitches, knitted by the long latch needles, to another group. These lines of arched threads are known as dropped stitches and are identical with what is known as a "run" in a torn stocking.

As shown in Figure 15, the yarn is fed under the hooks of the needles, as indicated at A, all needles will be pulled down by the needle lowering cam indicated in dotted lines at 14, the long latched needles will pull the yarn through previously formed loops as indicated at B, the short latched needle will pull the yarn down between the loops of two long latched needles as shown at C, and form an arch shaped loop 15 as shown in Figure 16. The knitting continues in the usual way until the needles are engaged by needle raising cam 2 which, being in its intermediate position as shown in Figure 15, will raise all of the needles to the same height. This will carry the latch of the short latched needle above the arched loop 15 as indicated at D and the loop in that needle will be shed when the needle is retracted by the needle lowering cam indicated in dotted lines at 16. The latches of the long latched needles will not be carried above the arched loop 15 and will hold their loops. The result is that on the knitting operation one loop in five will not form a stitch and the arched loop 15 takes the place of the stitch which, but for the action of the short latched needle, would have been formed. The short latched needle functions to pull the yarn down to form the arched loop but, in drop stitching, does not function to form a stitch.

To knit plain non-ribbed courses, that is a fabric knitted by the dial needles only, without any drop stitches, cam 2 is adjusted to its high position, as shown in Figure 14, where it raises all cylinder needles to a height which brings the lower ends of both the long and short latch needles above their loops. As the needles are moved downward by the usual cams, all cylinder needles will shed or slip out of their loops, so that the fabric is knitted only by the dial needles.

The low position of cam 2 is the usual position for causing the needles to knit a plain ribbed fabric by both dial and cylinder needles. The high position is the usual position for knitting a plain non-ribbed fabric by the dial needles only. The intermediate position of cam 2 is the position, which, if long and short latch needles are used, will cause only the short latch needles to shed or slip out of their loops.

When needles are omitted for the drop stitch the transverse strands of yarn are left practically straight and form a comparatively unyielding connection between the adjacent lines of regular stitching. With the short-latch needle engaging the yarn and pulling it into loop form a wider drop-space is made and the connection is more yielding or elastic. The wider drop-space is somewhat more conspicuous and produces a more attractive appearance than the old type.

With the cam 2 in its low position the short-latched needles function exactly as the other cylinder needles function and the machine has all the capacities of a ribbing machine with a full complement of identical needles including the capacity for making tuck stitches, welts, loose course, clearing course etc. These stitches and courses will differ from such stitches and courses made by machines in which needles are dropped by having all the stitches complete.

Inasmuch as the juncture between the rib top and plain or flat knitting is ordinarily a weak place it is a material advantage to produce several plain courses at this point which can only be done by a machine having all needles in operation.

When a top with a drop stitch is used as a double turn-over top the effect of this drop stitch is lost in the turn-over but, by producing the drop stitch on a two-feed ribber so arranged that two loops are taken and shed by the short-latched needles a much wider drop stitch effect is produced and will be effective in a turn-over top.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a ribbing machine, the combination with short-latched and long-latched cylinder needles of a needle raising cam, a long stud gear cam having a face adapted to hold the needle raising cam in an intermediate position to shed from the short-latched needles only, and means for actuating the long stud gear cam to so position the needle raising cam.

2. In a ribbing machine the combination with short-latched and long-latched cylinder needles of a needle raising cam, a cam post having a pin, a long stud gear, a long stud gear cam having faces adapted in cooperation with the cam post and its pin to raise the needle raising cam from low to intermediate position, a short stud gear, and a lever carried thereby adapted to actuate the stud gears to rotate the stud gear cam and raise the needle-raising cam to its intermediate position to shed from the short-latched needles only.

3. In a ribbing machine, the combination with short-latched and long-latched cylinder needles of a needle raising cam, a cam post fixed to said needle raising cam, a spring normally depressing said post and cam, a stud shaft, a cam on the upper end of said stud shaft, a pin on said post resting on the last mentioned cam, said last mentioned cam having a face adapted to hold the needle raising cam in an intermediate position to shed from the short-latched needles only.

4. A device as set forth in claim 3 in which the cam on the stud shaft is provided with a face engaging the pin on the cam post to move said first mentioned cam to either upper, intermediate, or lower positions and hold the same in the desired position, and means for actuating the last mentioned cam.

In testimony whereof I have signed my name to this specification.

HOWARD SEVERN REGAR.